(12) United States Patent  (10) Patent No.: US 12,044,484 B2
Haaland  (45) Date of Patent: Jul. 23, 2024

(54) HEAT TUBE FOR HEAT EXCHANGER (71) Applicant: DEERE & COMPANY, Moline, IL (US)

(72) Inventor: Eric J. Haaland, Waverly, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/710,068

(22) Filed: Mar. 31, 2022

(65) Prior Publication Data
US 2023/0314093 A1 Oct. 5, 2023

(51) Int. Cl.
F28F 1/40 (2006.01)
F28D 7/02 (2006.01)
F28F 1/04 (2006.01)
F28D 1/02 (2006.01)

(52) U.S. Cl.
CPC ............... *F28F 1/40* (2013.01); *F28D 7/024* (2013.01); *F28F 1/04* (2013.01); *F28D 2001/0273* (2013.01)

(58) Field of Classification Search
CPC .. F28F 1/08; F28F 1/022; F28F 9/0246; F28F 1/40; F28F 1/04
See application file for complete search history.

(56) References Cited

U.S. PATENT DOCUMENTS

| 2,571,647 | A | 10/1951 | Adams |
| 3,321,791 | A | 5/1967 | Olsen |
| 5,058,266 | A * | 10/1991 | Knoll ............... B21C 23/085 228/183 |
| 6,009,594 | A | 1/2000 | Grey |
| 6,192,978 | B1 * | 2/2001 | Guzowski ............ B21C 23/10 72/370.26 |
| 6,237,182 | B1 | 5/2001 | Cassar |
| 7,222,393 | B2 | 5/2007 | Kaffenberger et al. |
| 7,251,856 | B2 | 8/2007 | Kaffenberger et al. |
| 7,293,326 | B2 | 11/2007 | Hawkins et al. |

(Continued)

FOREIGN PATENT DOCUMENTS

| CN | 1296003 A | 5/2001 |
| CN | 2750774 Y | 1/2006 |

(Continued)

OTHER PUBLICATIONS

Translation of DE-19846347-A1 entitled Translation-DE19846347A1 (Year: 2023).*

(Continued)

*Primary Examiner* — Paul Alvare
(74) *Attorney, Agent, or Firm* — Michael Best & Friedrich LLP (57) ABSTRACT A heat exchanger including a first reservoir, a second reservoir, and a heat tube including a body extending between the first reservoir and the second reservoir, where the heat tube defines a working region having a cross-sectional shape with an exterior wall enclosing a channel therein that is in fluid communication with the first reservoir and the second reservoir. The heat tube includes a curvilinear tube axis extending the axial length of the working region, and where the body of the working region includes the cross-sectional shape extruded along the curvilinear tube.

12 Claims, 11 Drawing Sheets

(56) References Cited

U.S. PATENT DOCUMENTS

| | | | |
|---|---|---|---|
| 7,614,443 B2 * | 11/2009 | Usui | F28F 3/025 165/177 |
| 7,726,390 B2 | 6/2010 | Sucke et al. | |
| 7,882,593 B2 | 2/2011 | Beskow et al. | |
| 7,895,697 B2 | 3/2011 | Cassar | |
| 8,141,202 B2 | 3/2012 | Hawkins et al. | |
| 8,151,411 B2 | 4/2012 | Beskow et al. | |
| 8,234,750 B2 | 8/2012 | Hawkins et al. | |
| 8,286,294 B2 | 10/2012 | Cassar | |
| 8,302,251 B2 | 11/2012 | Beskow et al. | |
| 8,424,154 B2 | 4/2013 | Beskow et al. | |
| 8,474,094 B2 | 7/2013 | Maguire et al. | |
| 8,555,462 B2 | 10/2013 | Maguire et al. | |
| 8,650,707 B2 | 2/2014 | Hawkins et al. | |
| D793,640 S | 8/2017 | Buckley et al. | |
| 9,877,631 B2 | 1/2018 | Patterson et al. | |
| D810,372 S | 2/2018 | Buckley et al. | |
| D825,312 S | 8/2018 | Buckley et al. | |
| D846,966 S | 4/2019 | Buckley et al. | |
| 10,349,801 B2 | 7/2019 | Zhu et al. | |
| 10,470,638 B2 | 11/2019 | Patterson et al. | |
| 11,154,176 B2 | 10/2021 | Roberts | |
| 2001/0029640 A1 | 10/2001 | Cassar | |
| 2003/0155109 A1 * | 8/2003 | Kawakubo | F28F 9/185 165/173 |
| 2005/0161208 A1 * | 7/2005 | Sucke | B21C 35/02 165/177 |
| 2008/0040883 A1 | 2/2008 | Beskow et al. | |
| 2008/0087408 A1 * | 4/2008 | Maezawa | F28F 1/32 165/151 |
| 2017/0219291 A1 * | 8/2017 | Leemans | F28D 1/05366 |

FOREIGN PATENT DOCUMENTS

| | | | |
|---|---|---|---|
| CN | 204192534 U | 3/2015 | |
| CN | 204410740 U | 6/2015 | |
| CN | 105433887 A | 3/2016 | |
| CN | 209059079 U | 7/2019 | |
| CN | 209404666 U | 9/2019 | |
| CN | 209421855 U | 9/2019 | |
| CN | 211723037 U | 10/2020 | |
| CN | 213787214 U | 7/2021 | |
| DE | 19846347 A1 * | 4/2000 | F28D 1/05383 |
| DE | 10225812 C1 * | 8/2003 | F28F 1/02 |
| DE | 202004016953 U1 | 1/2005 | |
| GB | 2469453 B | 8/2012 | |
| GB | 2469458 B | 4/2013 | |
| GB | 2489626 B | 5/2013 | |
| JP | S58164995 A * | 9/1983 | |
| WO | 1999041982 A1 | 8/1999 | |

OTHER PUBLICATIONS

PWR. PWR Homepage. <https://web.archive.org/web/20220326162402/https://www.pwr.com.au/> webpage accessed Mar. 26, 2022 (10 pages).

* cited by examiner

HEAT TUBE FOR HEAT EXCHANGER

FIELD OF THE INVENTION

The present disclosure relates to a heat exchanger, and more specifically to a heat exchanger having improved heat transfer characteristics.

BACKGROUND

With traditional manufacturing processes heat exchangers were typically formed with assembled components which were brazed together. For fin tube assembly the fin would slide inside the tube. The tube itself would be formed using a rolling process that would result in tube walls having semi-circular tube ends where assembling a fin is difficult and would result in a "D" shape cavities on both ends where heat exchange was inefficient.

SUMMARY

In one embodiment, a heat exchanger including a first reservoir, a second reservoir, a heat tube including a body extending between the first reservoir and the second reservoir, where the heat tube defines a working region having a cross-sectional shape including an exterior wall enclosing a channel therein that is in fluid communication with the first reservoir and the second reservoir, where the heat tube includes a curvilinear tube axis extending the axial length of the working region, and where the body of the working region includes the cross-sectional shape extruded along the curvilinear tube.

In another embodiment, a heat exchanger including a first reservoir, a second reservoir, a heat tube extending between the first reservoir and the second reservoir, where the heat tube includes a working region having an exterior wall whose cross-sectional shape encloses a channel therein that is in fluid communication with both the first fluid reservoir and the second reservoir, where the exterior wall includes a top portion, a bottom portion opposite the top portion, a first end portion extending between the top portion and the bottom portion to define a first end zone, and a second end portion extending between the top portion and the bottom portion opposite the first end portion to define a second end zone, where at least one of the first end portion and the second end portion have a curvilinear shape as they extend along the axial length of the working region, and a plurality of fins positioned within the channel of the working region, and where at least one fin of the plurality of fins is positioned in at least one of the first end zone and the second end zone.

In another embodiment, a heat exchanger including a first reservoir, a second reservoir, a heat tube extending between the first reservoir and the second reservoir, where the heat tube includes a working region having an exterior wall whose cross-sectional shape encloses a channel therein that is in fluid communication with both the first fluid reservoir and the second reservoir, where the exterior wall includes a planar top portion, a planar bottom portion opposite the top portion, a first end portion extending between the top portion and the bottom portion, and a second end portion extending between the top portion and the bottom portion opposite the first end portion, where the top portion and the bottom portion define a central region therebetween having a first width, and where the first end portion and the second end portion both have a curvilinear shape as they extend along the axial length of the working region, and a plurality of fins positioned within the channel of the working region, and where at the fins define an overall fin width that is greater than the first width.

DETAILED DESCRIPTION

Before any embodiments of the heat exchanger and heat tube are explained in detail, it is to be understood that the heat exchanger device is not limited to the details set forth in the following description or illustrated in the accompanying drawings. The heat exchanger device is capable of supporting other implementations and of being practiced or of being carried out in various ways.

Figure 1:
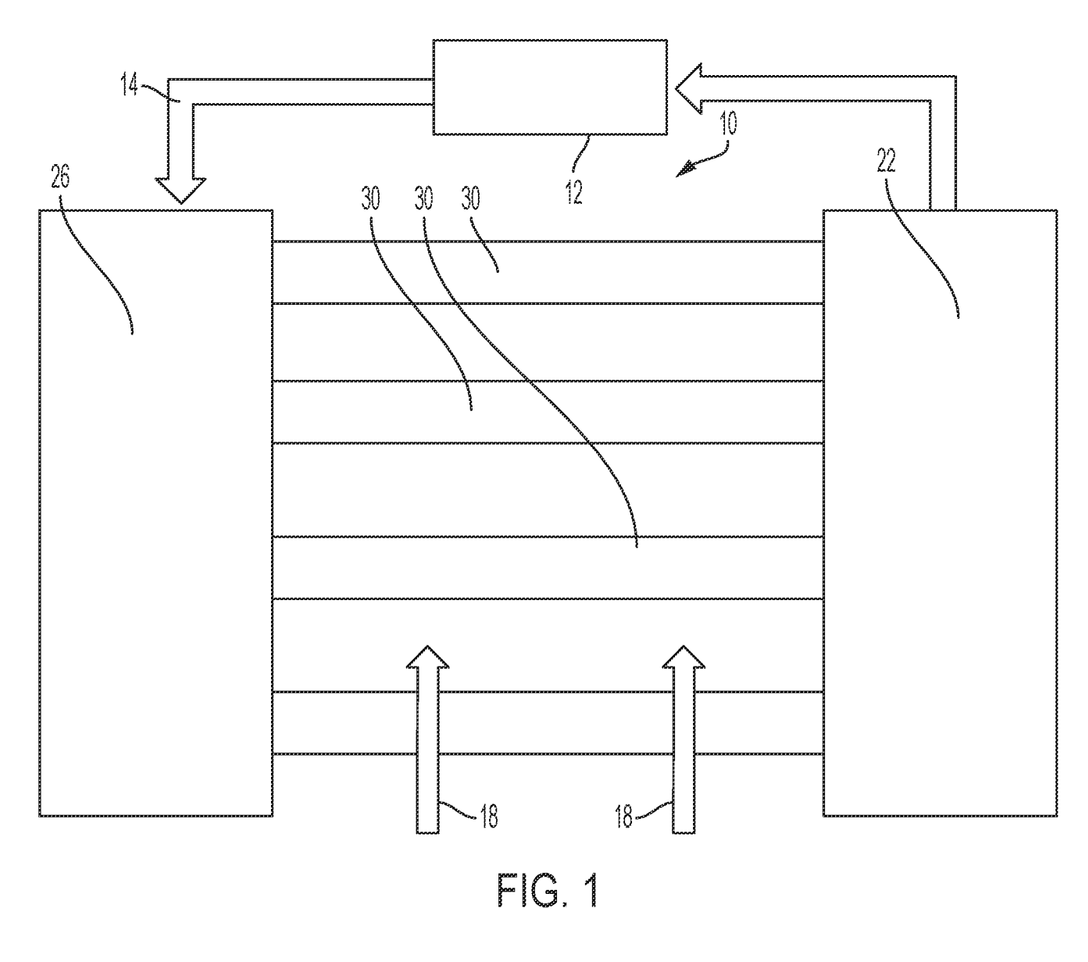
FIG. 1 is a schematic view of a heat exchanger according to the present application.

FIG. 1 illustrates a heat exchanger 10 for use together with a system or device 12 to exchange thermal energy between a first fluid 14 (e.g., coolant, water, oil, gas, and the like) and a second fluid 18 (e.g., air). More specifically, the heat exchanger 10 includes a first reservoir 22, a second reservoir 26, and a plurality of heat tubes 30 each extending in parallel between both the first reservoir 22 and the second reservoir 26 to provide a fluid path therebetween. During use, the first fluid 14 enters the first reservoir 22 from the device 12, the fluid 14 then flows through the plurality parallel heat tubes 30 where thermal energy is exchanged between the first fluid 14 and the second fluid 18, and then the fluid 14 is collected in the second reservoir 26 where it can be discharged back into the corresponding system 12. While the illustrated heat exchanger 10 is being presented as a liquid to air style heat exchanger, it is understood that the heat exchanger 10 may be employed for air to air, and liquid to liquid style systems as well. Furthermore, while the illustrated heat exchanger circuit is illustrated as a closed system, it is understood that in alternative embodiments the heat exchanger circuit may be a partial closed-partially open system whereby the heat exchanger itself is used as an EGR cooler whereby fresh air is combined with EGR gas before being conveyed into the combustion chamber of an engine. The heat exchanger 10 may also be adapted for use in other heat exchange situations.

Figure 5:
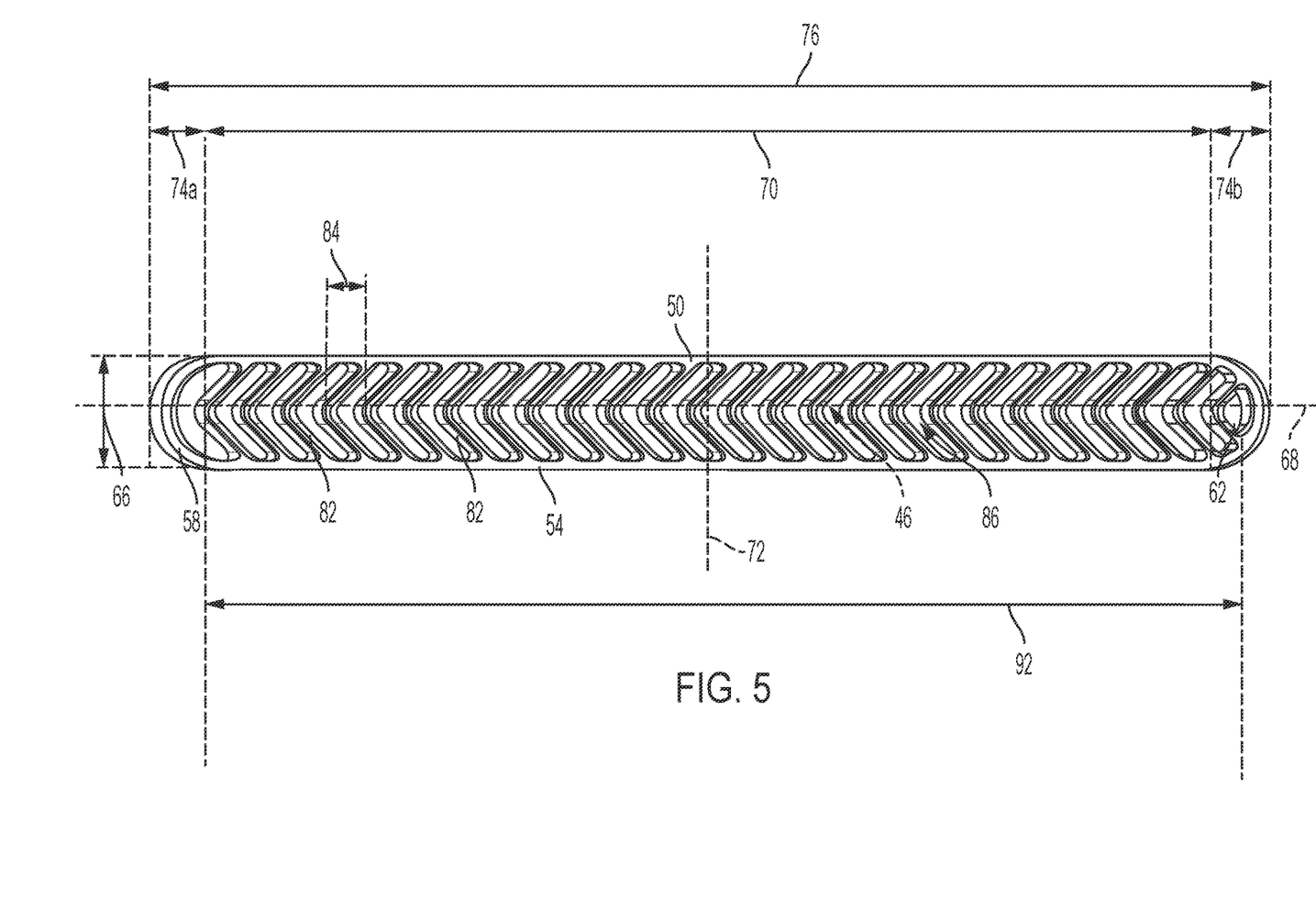
FIG. 5 is a section view taken along line 5-5 of FIG. 3.
Figure 5A:
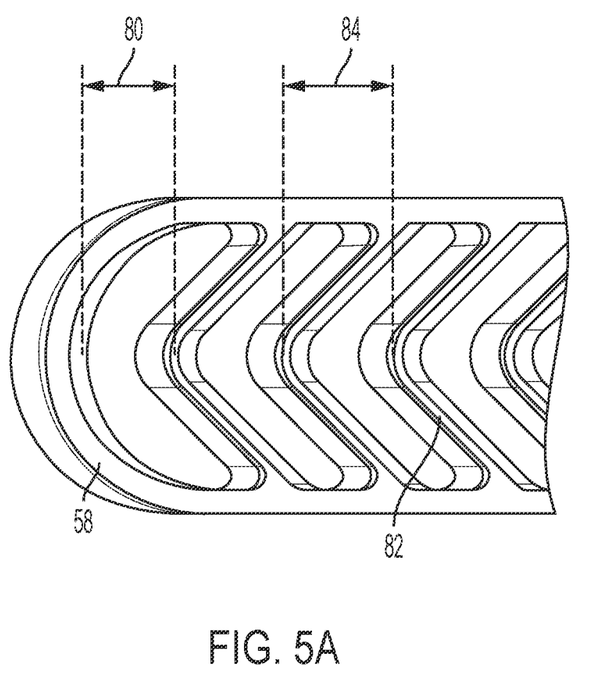
FIGS. 5A and 5B are a detailed views of FIG. 5.
Figure 5B:
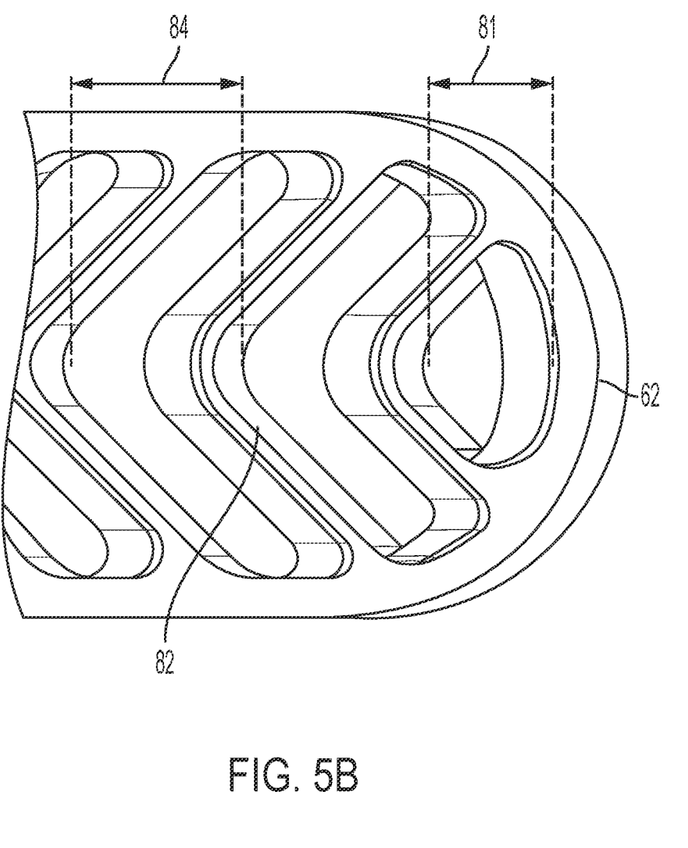
Figure 6:
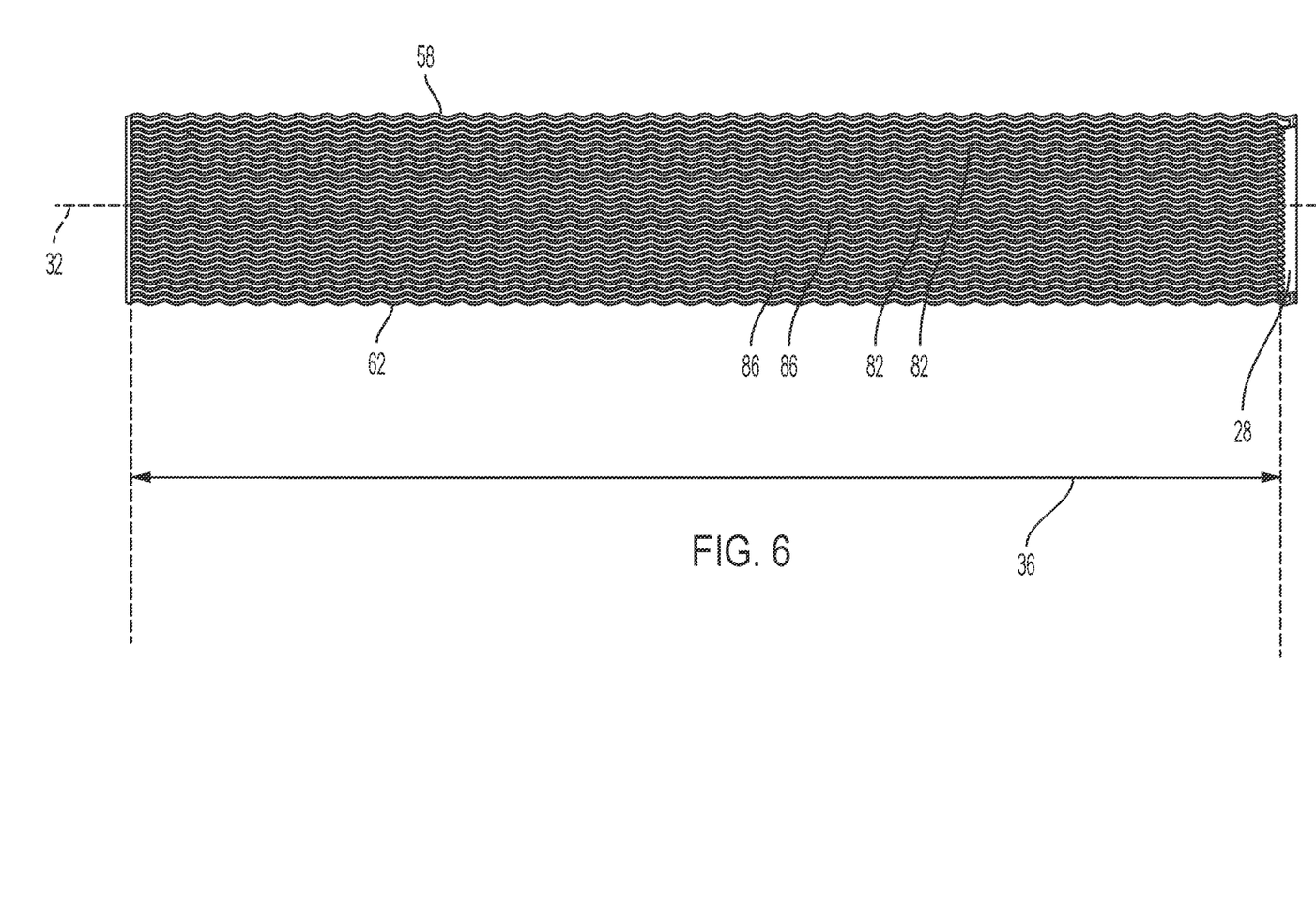
FIG. 6 is a section view taken along line 6-6 of FIG. 4.
Figure 7:
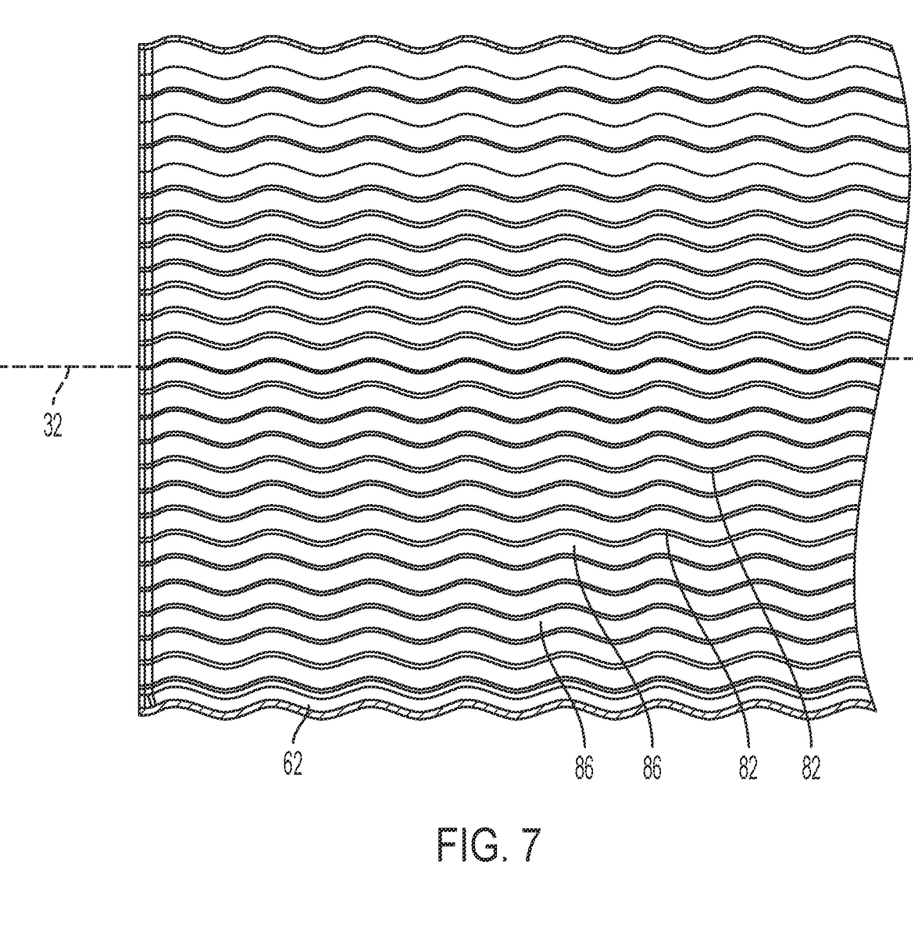
FIG. 7 is a detailed view of FIG. 6.
Figure 8:
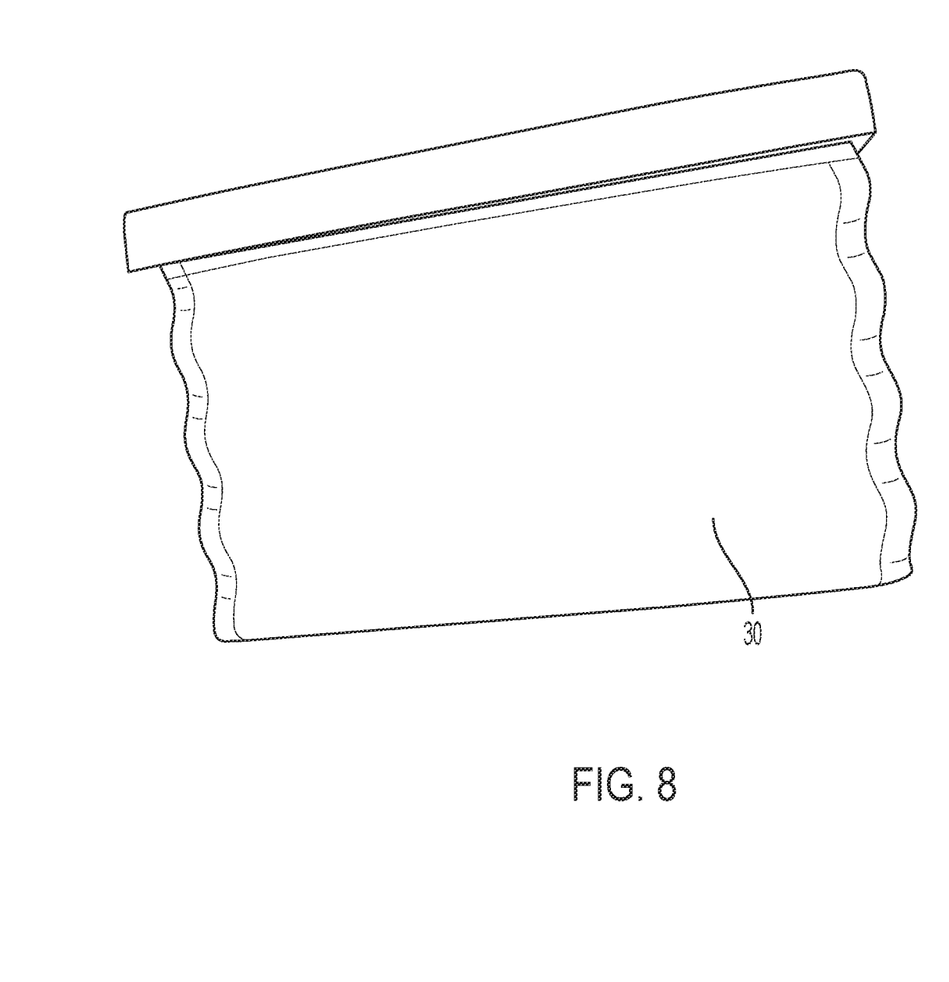
FIG. 8 is a photograph of a portion of a heat tube of FIG. 2.

As shown in FIGS. 2-7, each heat tube 30 is substantially elongated in shape having a body 34 with a first end 38 and a second end 42 opposite the first end 38. More specifically, each heat tube 30 includes a tube axis 32 along which the body 34 extends between the first end 38 and the second end 42. The heat tube 30 also defines a channel 46 extending along the tube axis 32 and being open to both the first end 38 and the second end 42. When assembled, the first end 38 of each heat tube 30 is coupled to the first reservoir 22 such that the channel 46 is open to and in fluid communication therewith. Similarly, the second end 42 of each heat tube 30 is coupled to the second reservoir 26 such that the channel 46 is open to and in fluid communication therewith. As shown in FIG. 6, the heat tube 30 may include a tube extension 28 extending from one or both ends of the heat tube 30. More specifically, the heat tube 30 may include a working region 36 where the fins 82 are positioned (described below) and one or more tube extensions 28 extending axially outwardly therefrom. The illustrated heat tube 30 includes a single tube extension 28 extending axially outwardly from the working region 36 from one end thereof, however in alternative embodiments a tube extension 28 may extend axially from both ends of the working region 36.

Figure 2:
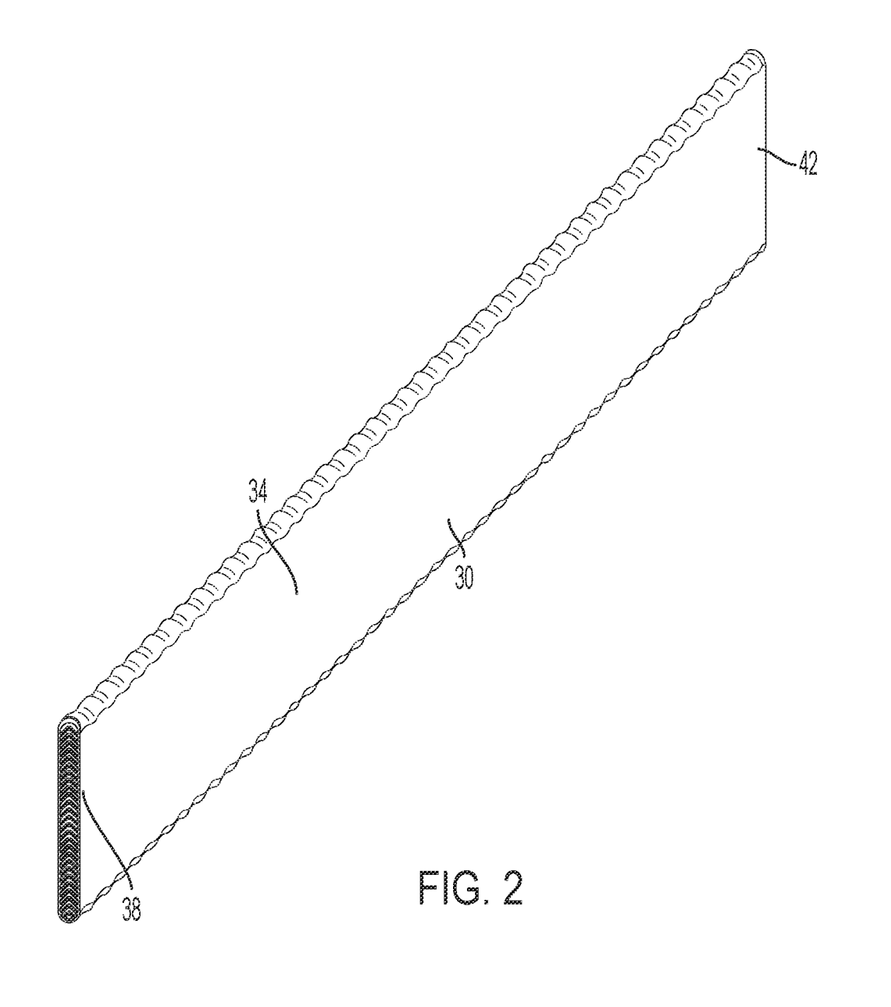
FIG. 2 is a perspective view of a heat tube of the heat exchanger of FIG. 1.
Figure 3:
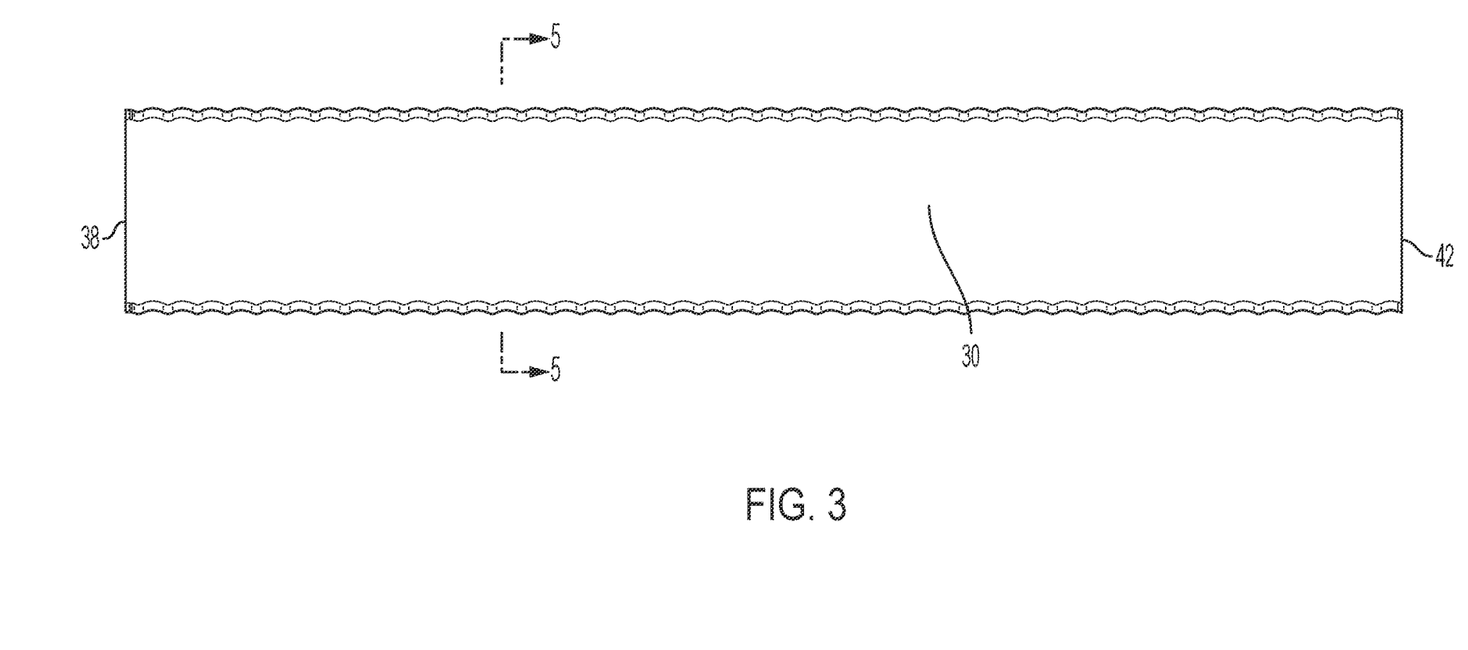
FIG. 3 is a top view of the heat tube of FIG. 2.
Figure 4:
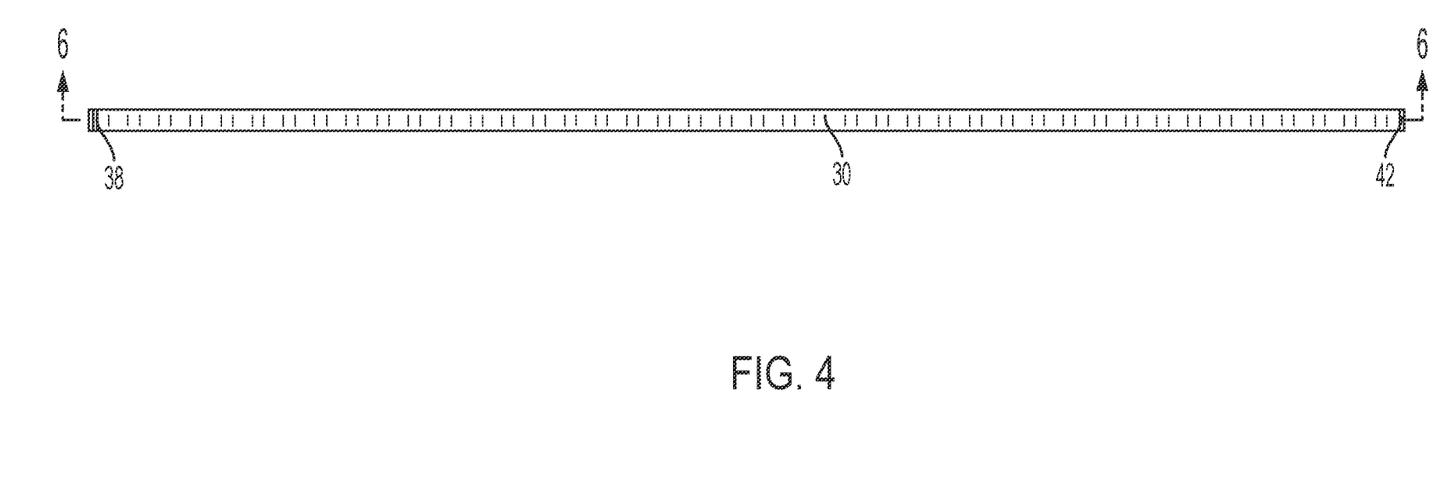
FIG. 4 is an end view of the heat tube of FIG. 2.

As shown in FIGS. 2 and 5, the body 34 of each heat tube 30 includes an exterior wall 34 whose cross-sectional shape taken normal to the tube axis 32 encloses the channel 46 therein. More specifically, for a given cross-section taken perpendicular to the overall axial length of the tube 30 within the working region 36 between the first end 38 and the second end 42, the exterior wall 34 includes a top or first portion 50, a bottom or second portion 54 opposite the first portion 50, a first end portion 58 extending between the first portion 50 and the second portion 54, and a second end portion 62 extending between the first portion 50 and the second portion 54 opposite the first end portion 58. The cross-section also defines a channel height 66, generally defined as the distance between the first portion 50 and the second portion 54, and a channel width 76, generally defined as the greatest distance between the first end portion 58 and the second end portion 62. The cross-section also defines a lateral axis 68 positioned midway between the first portion 50 and the second portion 54, and a mid-axis 72 positioned midway between the first and second end portions 58, 62. Still further, the tube axis 32 generally lies at the intersection of the lateral axis 68 and the mid axis 72 for any given cross-section of the body 34.

In the illustrated embodiment, both the first portion 50 and the second portion 54 of the cross-section are substantially linear and parallel to each other so that the passageway height 66 is constant across the entire width thereof. However, in alternative embodiments the first and second portions 50, 54 may be curvilinear and produce some form of curvature to vary the passageway height at different locations.

The first end portion 58 of the cross-section extends between the first portion 50 and the second portion 54. More specifically, the first end portion 58 forms an arcuate end-cap between the first and second portions 50, 54 to enclose the corresponding end of the channel 46. In the illustrated embodiment, the first end portion 58 has a constant radius forming a half-circle shape. However, in alternative embodiments different cross-sectional shapes may be present such as, but not limited to, pointed, squared, varying-radius curves, and the like.

The second end portion 62 is substantially similar to the first end portion 58. More specifically, the second end portion 62 forms an arcuate end-cap between the first and second portions 50, 54 to enclose the corresponding end of the channel 46 opposite the first end portion 58. In the illustrated embodiment, the second end portion 62 has the same cross-sectional shape as the first end portion 58, having a constant radius curve forming a half-circle shape. However, in alternative embodiments the second end portion 62 may include other cross-sectional shapes such as, but not limited to pointed, squared, varying-radius curves, and the like. Still further, while the illustrated second end portion 62 is the same as the first end portion 58, it is understood that in alternative embodiments the two end portions 58, 62 may differ in cross-sectional shape.

Together, the cross-sectional shape of the exterior wall 34 produces three zones within the channel 46. More specifically, the exterior wall 34 defines a central zone 70, and two end zones 74a, 74b. The central zone 70 is generally defined as the region of the cross-sectional area that lies between the first portion 50 and the second portion 54 being bound width-wise where the first and second portions 50, 54 meet the end portions 58, 62 (see FIG. 5). Furthermore, the first end zone 74a is generally defined as the region of the cross-sectional area that lies outside the central zone 70 and that is bounded by the first end portion 58. Similarly, the second end zone 74b is generally defined as the region of the cross-sectional area that lies outside the central zone 70 and that is bounded by the second end portion 62.

As shown in FIG. 5, the heat tube 30 also includes a plurality of fins 82 each positioned within the channel 46 and configured to influence the flow of the first fluid 14 therethrough. More specifically, the heat tube 30 includes a plurality of fins 82, each of which extend the entire channel height 66 being coupled to and extending between the first portion 50 and the second portion 54 of the exterior wall 34. Each fin 82 also extends the entire axial length of the working region 36 of the channel 46 (see FIG. 6). In the illustrated embodiment, each fin 82 of the plurality of fins 82 is substantially chevron shaped (see FIG. 5) with each fin 82 being oriented in the same direction. Furthermore, the fins 82 are positioned parallel to and a first distance 84 from each other subdividing the channel 46 into a series of smaller passageways 86. In the illustrated embodiment, the fins 82 are positioned such that the width of each individual passageway 86 (e.g., the first distance 84) is less than the channel height 66.

While the illustrated fins 82 are illustrated as being spaced at equal distances from each other, it is to be understood that in alternative embodiments the distances between individual fins 82 may vary. In the illustrated embodiment, the fins 82 are positioned so that at least one fin 82 is positioned in the first end zone 74a or the second end zone 74b. More specifically, the fins 82 are positioned so that at least one fin 82 is positioned in both the first end zone 74a and the second end one 74b.

When taken together, the plurality of fins 82 define an overall fin width 92, generally defined as the overall length from the forward-most fin (e.g., the fin positioned closest to the first end portion 58) and the rearward-most fin (e.g., the fin positioned closest to the second end portion 62) measured along the lateral axis 68. In the illustrated embodiment, the overall fin width 92 is greater than the width of the central zone 70. Still further, the fins 82 are positioned so that the lateral distance between the forward-most fin 82 and the first end portion 58 (where each element intersects the lateral axis 68; e.g., the second distance 80) is equal to or less than the first distance 84. Similarly, the lateral distance between the rearward-most fin 82 and the second end portion 62) measured where each element intersects the lateral axis 68; e.g., the third distance 81) is equal to or less than the first distance 84.

As shown in FIG. 6, the tube axis 32 extends the entire axial length between the first end 38 and the second end 42 of the body 34. For any given cross-section taken of a heat tube 30 perpendicular to the axial length of the tube 30, the axis 32 always lies at the intersection of the lateral axis 68 and the mid-axis 72. As such, the physical layout of the heat tube 30 can be viewed as an extrusion of the cross-sectional shape along the tube axis 32 over the axial length of the working region 36. In the illustrated embodiment, the tube axis 32 is curvilinear, causing the overall shape of the heat tube 30 to curve together therewith (e.g., the end portions 58, 62 and fins 82 all form curvilinear shapes in a complimentary fashion with the axis 32). More specifically, the tube axis 32 generally forms a sinusoidal curve along the lateral axis 68 having a first frequency and a first amplitude. By doing so, the exterior wall 34 and all of the fins 82 also form a sinusoidal curve along the lateral axis 68 between the first end 38 and the second end 42 of the body (e.g., the end portions 58, 62 form a sinusoidal shape; see FIG. 6). By doing so, the sinusoidal shape of the exterior wall 34 and fins 82 over the axial length of the heat tube 30 increases the overall surface area of the tube 30 for a given heat exchanger width increasing the overall heat transfer capabilities of the tube 30. Furthermore, by having the fins 82 follow the same sinusoidal curve the flow within the tube 30 is more efficient also helping to increase the heat transfer capabilities of the tube 30.

While the illustrated tube axis 32 forms a sinusoidal curve with a first frequency and a first amplitude oriented with the lateral axis 68 along the entire length of the working region 36 of the heat tube 30, it understood that the axis 32 may form different types and shapes of curves in various directions or even multiple directions (e.g., along the lateral axis 68 and mid-axis 72) and may vary over the axial length of the tube 30. For example, in some embodiments the tube axis 32 may form a triangle waveform or other repeating patterns. In still other embodiments, the amplitude and/or frequency of the waveform may vary along the axial length of the heat tube 30. In such embodiments, the frequency and/or amplitude may be greater in the middle or toward one or both ends of the tube 30 and slowly change as the axial distance changes.

Still further, while the illustrated heat exchanger 10 illustrates multiple heat tubes 30 each with tube axis 32 having the same curvilinear shape, it is understood that in other embodiments each heat tube 30 of a single heat exchanger 10 or some sub-group of tubes 30 may have tube axis 32 with different contours. For example, the tubes 30 may vary in amplitude and/or frequency and/or wave shape.

In the illustrated embodiment, each heat tube 30 is formed using additive manufacturing techniques so that the exterior wall 34 and the fins 82 are formed together as a single, monolithic piece of material. Still further, in other embodiments the first and second reservoirs 22, 26 may also be formed together with each or at least some of the heat tubes 30 to form a single piece of material.

Figure 9:
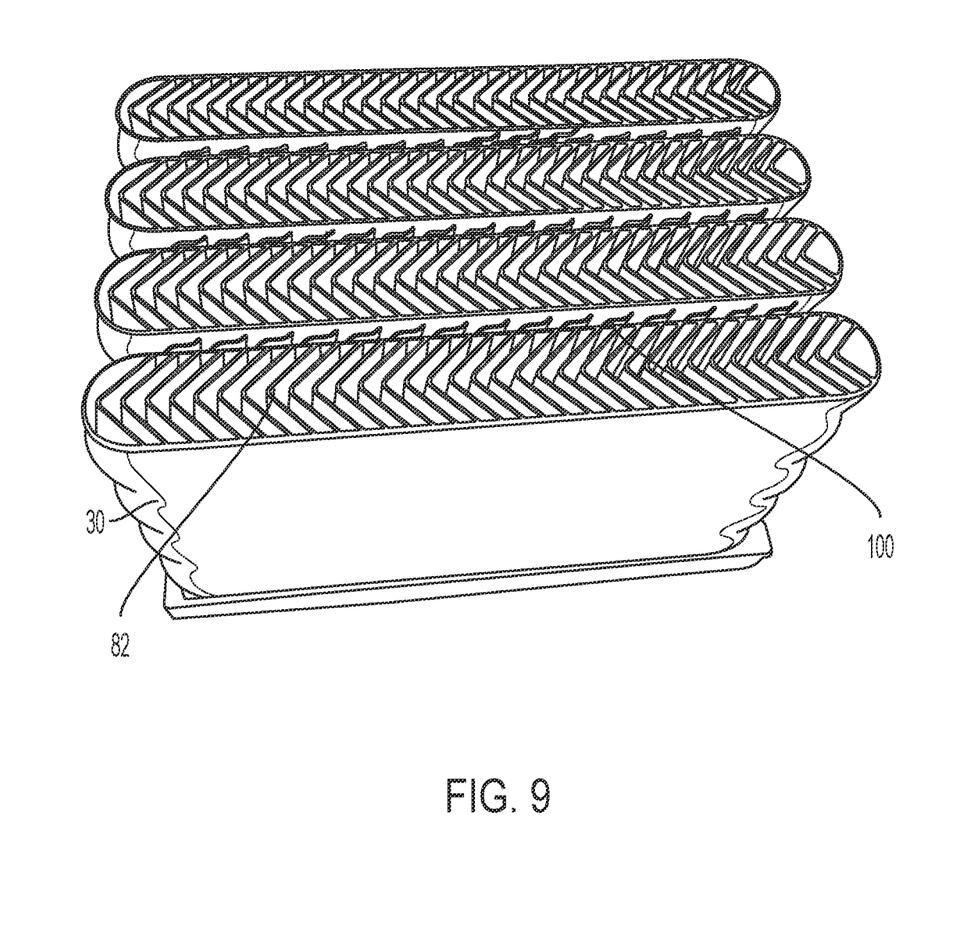
FIG. 9 is a photograph of four heat tubes of the heat exchanger of FIG. 1.

As shown in FIG. 9, the heat exchanger 10 may also include one or more fins 100 extending between adjacent heat tubes 30. In such embodiments, the fins 100 may be formed using additive manufacturing techniques so that the fins 100 and the adjacent heat tubes 30 are all formed together as a single piece of material.

The invention claimed is:

1. A heat exchanger comprising:
a first reservoir;
a second reservoir;
a heat tube including a body extending between the first reservoir and the second reservoir, wherein the heat tube defines a working region having a cross-sectional shape including an exterior wall enclosing a channel therein that is in fluid communication with the first reservoir and the second reservoir, wherein the heat tube includes a curvilinear tube axis extending the axial length of the working region, and wherein the body of the working region includes the cross-sectional shape extruded along the curvilinear tube axis, and wherein the exterior wall includes a top portion, a bottom portion opposite the top portion, a first end portion extending between the top portion and the bottom portion, and a second end portion extending between the top portion and the bottom portion opposite the first end portion;
wherein the heat tube also includes a fin positioned within the working region of the channel and formed integrally with the exterior wall, wherein the fin has a chevron cross-sectional shape taken perpendicular the tube axis that extends between the top portion and the bottom portion, wherein the chevron includes an apex, and wherein the fin extends along the axial length of the working region producing a curvilinear shape such that the apex maintains a constant lateral distance relative to the first end wall along the entire axial length of the working region.

2. The heat exchanger of claim 1, wherein the tube axis is sinusoidal.

3. The heat exchanger of claim 1, wherein the first end portion defines a first end zone, and wherein the second end portion defines a second end zone.

4. The heat exchanger of claim 1, wherein the top portion and the bottom portion are parallel to each other.

5. The heat exchanger of claim 3, wherein at least one of the first end portion and the second end portion are semi-circular in shape.

6. The heat exchanger of claim 3, wherein the apex of the fin is located in at least one of the first end zone and the second end zone.

7. The heat exchanger of claim 1, wherein the tube axis defines a lateral axis extending through the first end portion and the second end portion, and wherein the curvilinear tube axis lies along the lateral axis.

8. The heat exchanger of claim 7, wherein the curvilinear tube axis is sinusoidal.

9. The heat exchanger of claim 1, further comprising a first tube extension extending outwardly from one end of the working region.

10. The heat exchanger of claim 9, wherein the first tube extension is at least partially positioned within one of the first reservoir and the second reservoir.

11. The heat exchanger of claim 1, wherein the heat tube and plurality of fins are formed using additive manufacturing techniques.

12. The heat exchanger of claim 7, wherein the apex of the fin is located in at least one of the first end zone and the second end zone over the entire axial length of the working zone.

* * * * *